(12) United States Patent
Larsson et al.

(10) Patent No.: US 6,522,887 B2
(45) Date of Patent: *Feb. 18, 2003

(54) IDENTIFYING STARTING TIME FOR MAKING TIME OF ARRIVAL MEASUREMENTS

(75) Inventors: Erik Larsson, Kista (SE); Ari Kangas, Uppsala (SE); Sven Fischer, Nürnberg (DE)

(73) Assignee: TeleFonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,201
(22) Filed: Jul. 27, 1998
(65) Prior Publication Data

US 2001/0044311 A1 Nov. 22, 2001

(51) Int. Cl.⁷ .................................. H04Q 7/20
(52) U.S. Cl. ................... 455/456; 455/423; 455/457; 342/457
(58) Field of Search ................. 455/423, 456, 455/457; 342/457

(56) References Cited

U.S. PATENT DOCUMENTS

| | | | |
|---|---|---|---|
| 5,196,856 A | * 3/1993 | Litchford et al. ............ 342/455 |
| 5,317,323 A | 5/1994 | Kennedy et al. ............. 342/457 |
| 5,327,144 A | 7/1994 | Stilp et al. ................... 342/387 |
| 5,365,516 A | 11/1994 | Jandrell ....................... 370/18 |
| 5,512,908 A | 4/1996 | Herrick ....................... 342/387 |
| 5,519,760 A | 5/1996 | Borkowski et al. ........... 379/59 |
| 5,634,192 A | * 5/1997 | Meche et al. ................ 455/437 |
| 5,952,969 A | * 9/1999 | Hagerman et al. .......... 342/457 |
| 5,999,129 A | * 12/1999 | Rose ............................ 342/394 |
| 6,006,097 A | * 12/1999 | Hornfeldt et al. ............ 455/456 |
| 6,031,490 A | * 2/2000 | Forssen et al. ............. 342/457 |
| 6,040,800 A | * 3/2000 | Raith et al. ................. 342/387 |
| 6,047,192 A | * 4/2000 | Maloney et al. ............. 455/456 |

FOREIGN PATENT DOCUMENTS

| | | |
|---|---|---|
| DE | 44 09 178 A | 9/1995 |
| WO | WO 95/26510 | 3/1994 |
| WO | WO 99/09778 | 2/1999 |

OTHER PUBLICATIONS

Rantalainen et al., *Mobile Station Based Location Calculation in E–OTD Method*, Nokia, (T1P1.5/98–244R1), Jul. 17, 1998.

* cited by examiner

Primary Examiner—Thanh Cong Le
Assistant Examiner—Alan T. Gantt
(74) Attorney, Agent, or Firm—Jenkens & Gilchrist, P.C.

(57) ABSTRACT

A time of arrival measurement apparatus is used to measure the time of arrival of a radio signal transmitted by a mobile communication station operating in a wireless mobile communication network. The apparatus is provided with information indicative of a predetermined point in time at which the radio signal is to be transmitted. The time of arrival measurement apparatus monitors for arrival of the radio signal only during a period of time after the predetermined point in time.

60 Claims, 5 Drawing Sheets

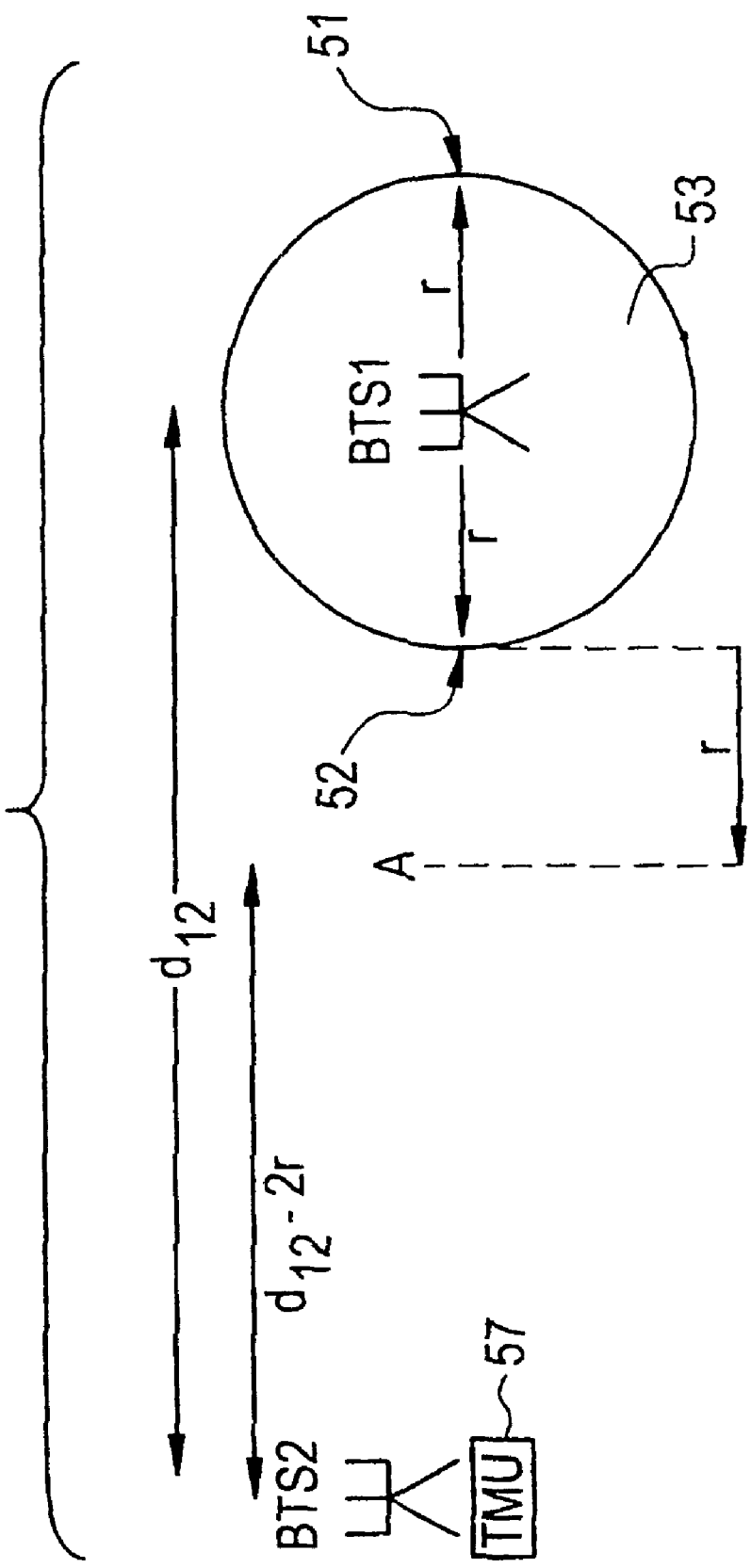

IDENTIFYING STARTING TIME FOR MAKING TIME OF ARRIVAL MEASUREMENTS

FIELD OF THE INVENTION

The invention relates generally to locating the position of a mobile communication unit in a wireless communication network and, more particularly, to uplink time of arrival measurements.

BACKGROUND OF THE INVENTION

The ability to locate the position of a mobile communication unit operating in a wireless communication system provides many well known advantages. Exemplary uses of such position locating capability include security applications, emergency response applications, and travel guidance applications. Among several possible techniques for providing position locating capability, uplink time of arrival (TOA) techniques are attractive because they normally do not require any changes to the mobile communication units.

One example of an uplink time of arrival approach will now be described with respect to the Global System for Mobile Communication (GSM), which is exemplary of a wireless communication system in which uplink time of arrival techniques are applicable. When an external application (or the GSM network itself) decides to locate the position of a mobile unit (also referred to as mobile station), a Mobile Location Center forces (via a base station controller) the mobile unit to perform a conventional intra-cell handover, whereupon the mobile unit transmits up to 70 uplink access bursts, one burst per TDMA frame (i.e., one burst every 8 time slots). The mobile unit transmits the access bursts in an attempt to comply with the intracell handover command.

The Mobile Location Center (MLC) orders a number of TOA Measurement Units (TMUs) to capture the access bursts and measure the time of arrival of each burst at each TMU. The TMUs then provide the MLC with their time of arrival measurements and reliability estimates for these measurements. In order to compute the position of the mobile station, the MLC uses the time of arrival values and corresponding reliability parameters, the geographic location coordinates of the TMUs, and information regarding time differences among the respective internal time bases of the, TMUs. For example, each TMU can be provided with an absolute time reference (e.g., a Global Positioning System (GPS) clock), in which case the TMUs are all synchronized together, so that relative time differences among the TMUs are not a factor in the MLC's calculation of the position of the mobile station.

However, if the TMUs do not include an absolute time reference, then the relative differences among their respective local time references can be determined, for example, by having each TMU measure the time of arrival of an uplink burst from a stationary reference mobile station positioned at a known location in the network. The time of arrival information for the reference mobile station is then transmitted from the TMUs to the MLC. The MLC can use these time of arrival measurements to compute the relative differences in the timing references of the respective TMUs, also referred to as inter-TMU time differences (ITTDs).

More specifically, because the MLC knows the location of the reference mobile station and also knows the locations of the TMUs, the MLC can easily calculate the expected difference (in absolute time) between the time of arrival of the burst at a first TMU and the time of arrival of the burst at a second TMU. Then, when the MLC receives the time of arrival information as actually observed at the first and second TMUs, it can compare the difference between observed arrival times to the expected difference as previously calculated. By this comparison, the actual time difference between the local time references of the first and second TMUs (the ITTD of the first and second TMUs) can be readily determined. Time of arrival measurements on the reference mobile station can be made periodically by the TMUs, and provided to the MLC for use in determining the ITTDs, so that MLC can maintain an updated record of the ITTDs.

In addition to the technique described above, other conventional techniques are also available for determining the ITTDs.

Because the MLC knows the ITTDs (or alternatively knows that the TMUs are all synchronized by a GPS system), it can calculate an estimate of the position of a given mobile station from the time of arrival information provided by the TMUs, using conventional Time Difference of Arrival (TDOA) techniques.

One problem with the above-described uplink time of arrival techniques is that the TMUs do not know when they should expect, or begin to monitor for, the access bursts from the mobile station. This has the following disadvantages. The sensitivity of conventional time of arrival measurement algorithms decreases as the uncertainty in the a priori knowledge of the arrival time increases. This is due to the fact that more noise and interference is received if the receiver does not know when the "meaningful" data is coming. Also, the TMU must monitor for a long time in order to be sure that it captures the desired bursts. Thus, the utilization efficiency of the TMU hardware is disadvantageously degraded.

Furthermore, in a frequency hopping system such as GSM, the access bursts are transmitted on a frequency hopped channel. In this situation, not only does the TMU not know when to begin monitoring for the access bursts, but it also does not know which frequency it should monitor. Thus, not only is an undesirably long monitoring time possible, but the TMU would also be required to include a receiver for each frequency in the hop sequence so that all possible frequencies could be monitored.

It is therefore desirable to provide time of arrival measuring devices with information indicative of when the access bursts can be expected to arrive, and which frequency will be used to transmit the access bursts. According to the present invention, such information is provided to time of arrival measuring devices, thereby avoiding the aforementioned problems associated with conventional time of arrival techniques.

BRIEF DESCRIPTION OF THE DRAWINGS

FIG. 5 illustrates how an example monitoring window is determined according to the invention.

DETAILED DESCRIPTION

Figure 1:
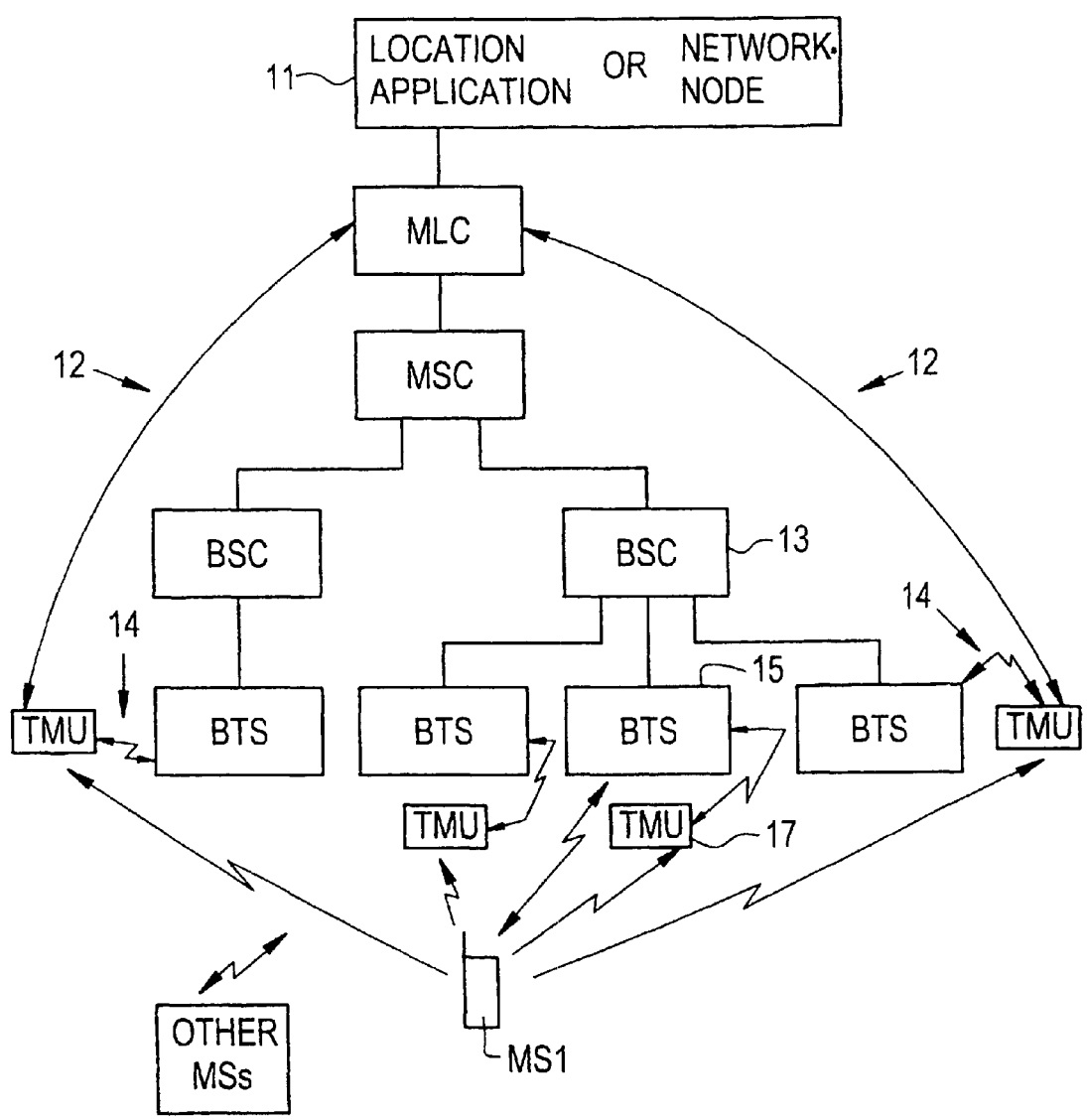
FIG. 1 is a block diagram of an exemplary wireless communication system including uplink time of arrival capability according to the present invention.

FIG. 1 illustrates one example of a pertinent portion of a wireless communication system including the uplink time of arrival capability according to the present invention. The invention is implemented in a GSM network in the example of FIG. 1. As shown in FIG. 1, a GSM mobile switching center MSC is coupled for communication with a plurality of GSM base station controllers BSCs, which are in turn coupled to communicate with one or more GSM base transceiver stations BTSs. The base transceiver stations are capable of radio communication with a plurality of mobile stations MSs via the air interface. Communication from the MSC to the MSs via the BSCs and the BTSs is well known in the art.

FIG. 1 also includes time of arrival measurement units TMUs which communicate with respective base transceiver stations via radio signaling through the air interface. A mobile location center MLC is coupled to communicate with the mobile switching center MSC using conventional GSM signaling protocol. In FIG. 1, the MLC can receive a request to locate the position of a mobile station MS1. Such a request can be received from a node within the network itself, or from an external location application as illustrated at 11 in FIG. 1. In response to this request, the MLC interrogates the MSC to thereby determine the serving BTS 15 (i.e., the serving GSM cell) and to receive from the serving BSC 13 (via MSC) all available physical channel parameters associated with the serving cell, including all frequency hopping parameters. The MLC decides which TMUs should be involved in the uplink time of arrival measurements, and initiates a conventional intracell handover command (via MSC and BSC 13), which intracell handover command is then to be transmitted to the mobile station MS1 by BTS 15.

The intracell handover command in GSM includes starting frame and time slot information which directs the mobile station to begin the conventional access burst (responsive to the intracell handover command) at a specified TDMA time slot in a specified TDMA frame. When initiating the intracell handover command via communication with BSC 13, the MLC either specifies to BSC 13 the frame number and time slot number, or receives from BSC 13 the frame number and time slot number that have been specified by BSC 13.

Communications between the MLC and the TMUs can occur, for example, via conventional Short Message Service using the air interface between the MLC and the TMUs (see, e.g., 12 in FIG. 1), or via the air interface between the TMUs and BTSs (see, e.g., 14 in FIG. 1) and the network communication path from BTS through BSC and MSC to MLC.

The TMUs periodically monitor the broadcast control channels of the respective base transceiver stations with which they communicate. Each TMU provides the MLC with the frame structure timing of its associated BTS relative to the TMU's own local time reference. This frame structure timing information can be transmitted from the TMUs to the MLC via, for example, conventional Short Message Service utilizing the air interface between the TMU and the MLC. This frame structure timing information can be updated periodically by the TMUs and sent to MLC periodically. Thus, when the MLC initiates the intracell handover command, which specifies the frame number and time slot number for the access burst from the mobile station, the MLC also knows the frame structure timing currently used by the mobile station MS1 in communication with its serving base transceiver station 15.

Moreover, the MLC also knows any inter-TMU timing differences (ITTDs) among the TMUs selected to make the uplink time of arrival measurements on the mobile station MS1. As described above in detail, the TMUs can all include a conventional absolute time reference, or the MLC can calculate the inter-TMU time differences among the TMUs using uplink time of arrival measurements made by the TMUs on a stationary reference mobile station located in a known position. The MLC can therefore determine the frame structure timing according to the local time reference of any TMU by simply translating the frame structure timing measurement from the local timing of the TMU that made the frame structure timing measurement (TMU 17 in the example of FIG. 1) to the local timing of any of the TMUs selected to make TOA measurements on MS1. Thus, when the MLC requests an intracell handover command specifying a frame number and time slot number of the access burst, the MLC can also communicate to the selected TMUs the frame number, the time slot number and the frame structure timing of the serving BTS (and thus the mobile station also) relative to the local timing of each respective TMU. Now, each TMU will know, relative to its own local timing reference, precisely when the mobile station will begin transmitting the first access burst.

In addition, the mobile location center can request from the base station controller 13 the conventional hopping sequence parameters associated with the serving base transceiver station 15. These parameters can also be transmitted from MLC to the TMUs along with the frame number, time slot number and frame structure timing. With knowledge of the conventional hopping sequence parameters and the frame and time slot numbers, the TMUs can then calculate the hopping sequence in conventional fashion. Thus, the TMUs will all know when (frame and time slot numbers), and on which frequency, to begin monitoring for the arrival of the access burst from the mobile station.

The MLC may also compute a monitor window beginning at the starting time as specified by the frame number and time slot number in the intracell handover command, and extending for a time period determined as shown in the example of FIG. 5. FIG. 5 illustrates one example of how monitoring windows can be established for the TMUs of FIG. 1. The example of FIG. 5 illustrates determination of a monitoring window for a TMU 57 that is substantially cosited with a base transceiver station designated as BTS2. The TMU illustrated in FIG. 5 will make time of arrival measurements on bursts received from a mobile station currently being served by the base transceiver station designated as BTS1. In this situation, the longest transmission time before the burst arrives at the TMU will occur when the mobile station is located at 51, namely on the boundary of serving cell 53 opposite the TMU 57. If T0 designates the starting time of the access burst (as defined by the frame number and time slot number received by the mobile station in the intracell handover command), then the access burst from the mobile station will actually arrive at BTS1 at the starting time T0 due to the fact that the mobile station is synchronized to the serving BTS1. This operation is conventional in, for example, GSM systems.

Due to the aforementioned synchronization, the access burst will have already arrived at BTS1 at time T0, so the total transmission time to the TMU will be $T0 + d_{12}/c$, where $d_{12}$ is the distance between BTS1 and the TMU 57, and c is the speed of light. On the other hand, the shortest transmission time between the mobile station and the TMU will occur when the mobile station is located at 52, namely on the cell boundary of cell 53 nearest to the TMU. With the mobile station located at 52, the access burst will have reached point A at time T0, so that the total transmission time to the TMU will be given by $T0+(d_{12}-2r)/c$, where r is the radius of the serving cell 53. Thus, the monitoring window for the TMU 57 of FIG. 5 would begin at time $T0 +(d_{12}-2r)/c$, and would extend until time To $+d_{12}/c$. This monitoring window is easily calculated by the MLC which has stored therein or available thereto the cell radius information of all cells covered by the MLC, and either the distances between all base transceiver stations (in the case of TMUs cosited with the base transceiver stations) or the geographic coordinates of all base transceiver stations and all TMUs (to accommodate architectures wherein the TMUs are not necessarily cosited with base transceiver stations).

Rather than using the cell radius r to calculate the search window, the MLC could alternatively use the current Timing Advance (TA) value, which is conventionally available from the serving BTS. The TA value gives a rough estimate of the distance between the mobile station and the serving BTS. Because the TA value will correspond to a distance less than or equal to the cell radius r, use of the TA value can often reduce the search window by locating the beginning point of the window later in time than it would be if the cell radius r were used.

Figure 2:
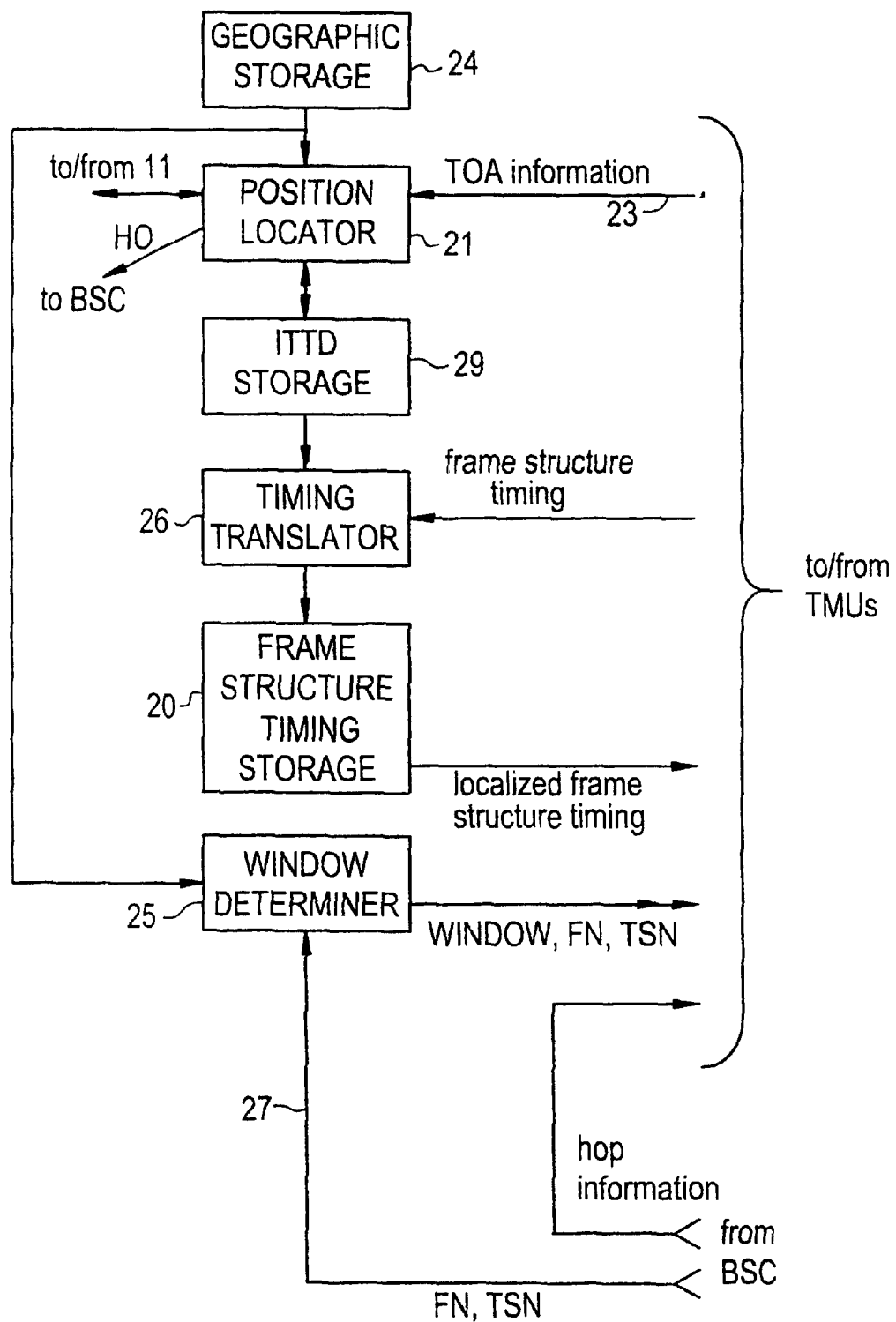
FIG. 2 illustrates an example of the mobile location center of FIG. 1 in greater detail.

FIG. 2 illustrates one example of the mobile location center MLC of FIG. 1 in greater detail. In the example of FIG. 2, the MLC includes a position locator 21 which receives the location requests from the location application or network mode at 11 in FIG. 1. The position locator is coupled to a geographic storage portion 24 for storing therein, for example, the geographic coordinates of the TMUs, the geographic coordinates of the base transceiver stations, and the cell radius of each cell covered by the MLC (or current TA value of any mobile station that is being located). The position locator includes an input 23 where time of arrival information (and associated reliability estimate) from the TMUs is received. The position locator 21 implements well-known time difference of arrival techniques in response to the time of arrival information.

For example, position locator 21 can operate to solve the equation OTD=GTD+ITTD where OTD is the observed time difference (difference between TMU-measured times of arrival), GTD is geographic time difference (difference between times of arrival in absolute time). Thus, the observed time differences differ from the geographic time differences due to ITTD as described above. When MLC is locating a mobile station, OTD and ITTD are known, so the equation is solved for GTD, and when MLC is determining the ITTDs using a stationary reference mobile, OTD and GTD are known, so ITTD can be calculated. When the position of the mobile station has been located by the position locator, the position locator outputs the position location information to the requesting node (network or external) from which the original location request was received. Position locator 21 can determine the ITTDs from time of arrival measurements made by TMUs on a stationary reference mobile station. The ITTDs are stored in storage portion 29.

The position locator also outputs an intracell handover request (HO) to BSC, in which the position locator can specify the desired starting frame and time slot numbers.

The MLC further includes a window determiner 25 which determines the monitoring window for each TMU, for example, in the manner described above with respect to FIG. 5. The window determiner has an input 27 for receiving the starting time (frame number FN and time slot number TSN) from the BSC 13 (via MSC). Window determiner 25 is also coupled to geographic storage portion 24 to permit access to geographic location information needed to compute the monitoring windows. A timing translator 26 receives frame structure timing information for each BTS from the associated TMU assigned to measure that BTS, and uses the ITTDs stored at 29 to translate the frame structure timing information into the timing reference of every other TMU. Frame structure timing information for every BTS relative to every TMU's local timing reference is stored in storage portion 20.

The MLC includes a further input for receiving the hopping sequence information from the BSC 13(via MSC). The MLC provides as output a positioning measurement command to the selected TMUs (via MSC, BSC and BTS), the command including (1) monitoring window information and the frame number FN and time slot number TSN from window determiner 25, (2) hopping sequence information as received at MLC from BSC, and (3) localized frame structure timing from storage portion 20.

Figure 3:
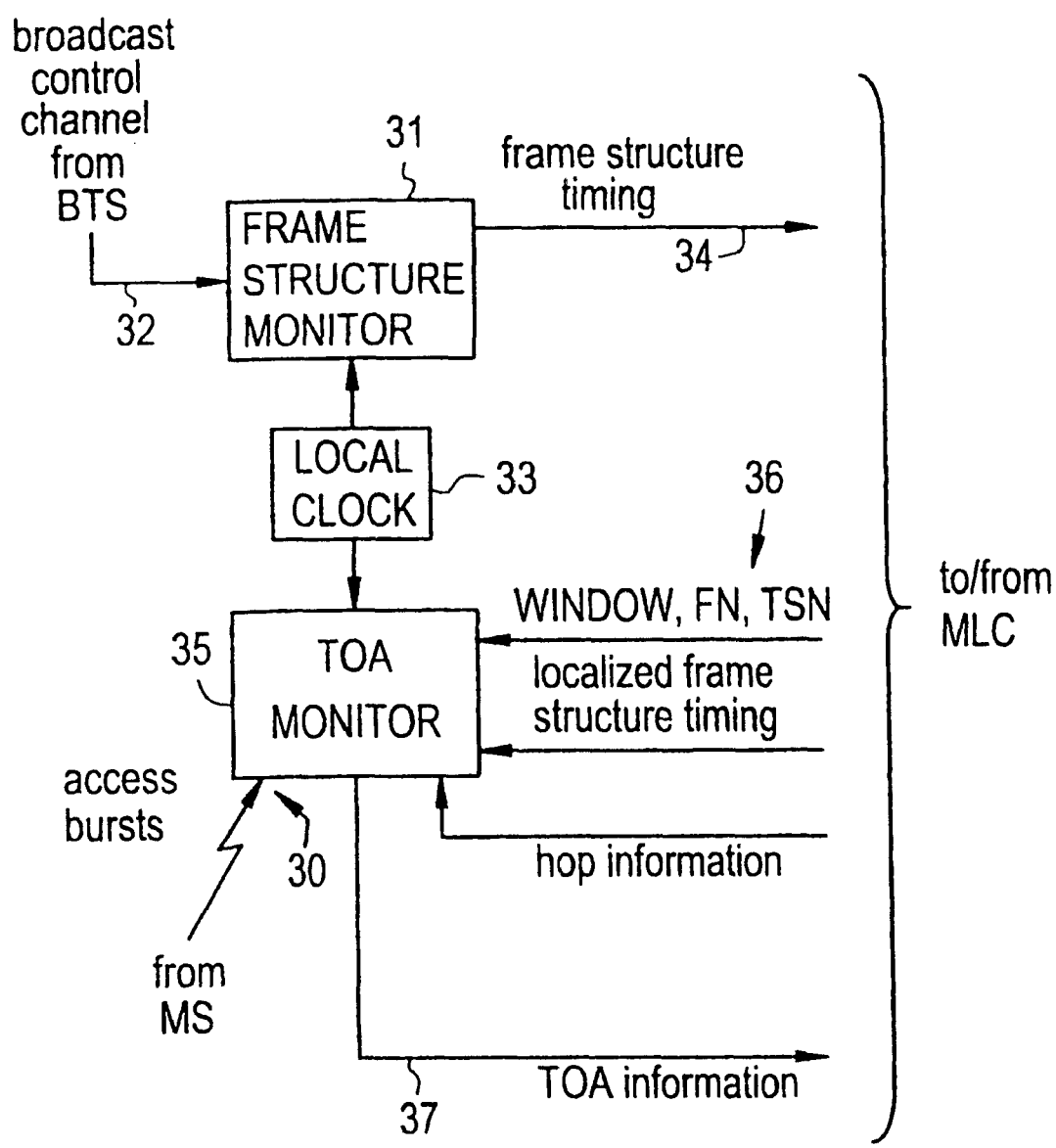
FIG. 3 illustrates an example of the TOA measurement units of FIG. 1 in greater detail.

FIG. 3 illustrates an example embodiment of the TMUs of FIG. 1. The TMU of FIG. 3 includes a frame structure monitor 31 including an input 32 for monitoring the broadcast control channel (or other channel suitable for determining frame structure timing) of the associated base transceiver station of FIG. 1, and an output 34 for providing the frame structure timing information to the MLC (via BTS, BSC and MSC). The frame structure monitor receives its timing from the TMU's local clock 33. As discussed above, the frame structure monitor receives the broadcast control channel of the associated BTS and determines the frame structure timing of the BTS relative to the TMU's local clock. This frame structure timing information is then transmitted to the MLC at 34.

The TMU of FIG. 3 further includes a time of arrival monitor 35 which includes an input 30 for receiving the access bursts from a mobile station, and a further input 36 for receiving the positioning measurement command information provided by MLC as described above. The time of arrival monitor also includes an output 37 for providing time of arrival information (and associated reliability estimates) to the MLC. The time of arrival monitor 35 can monitor the input 30 for access bursts during the window as defined by the received window information. The window information and starting frame and time slot numbers (FN and TSN) are interpreted by the TOA monitor 35 in conjunction with the localized frame structure timing information, so the monitoring window is properly adjusted to the local clock timing of the TMU.

The time of arrival monitor also uses the hopping sequence information, in conjunction with the starting frame and time slot numbers to compute the hopping sequence used by the mobile station and its serving base transceiver station. Such computation of a frequency hopping sequence is a well known conventional procedure. Thus, the TMU will advantageously monitor the access bursts on the correct frequency and during a limited window of time which includes the arrival time of the access bursts. The window is of course easily re-used to A measure subsequent access bursts in the (potentially) 70 burst sequence. Even without receiving the window information, the monitor would still know the burst starting time from FN, TSN and the localized frame structure timing, and thus could alternatively monitor for a predetermined default window time beginning at the known starting time.

Figure 4:
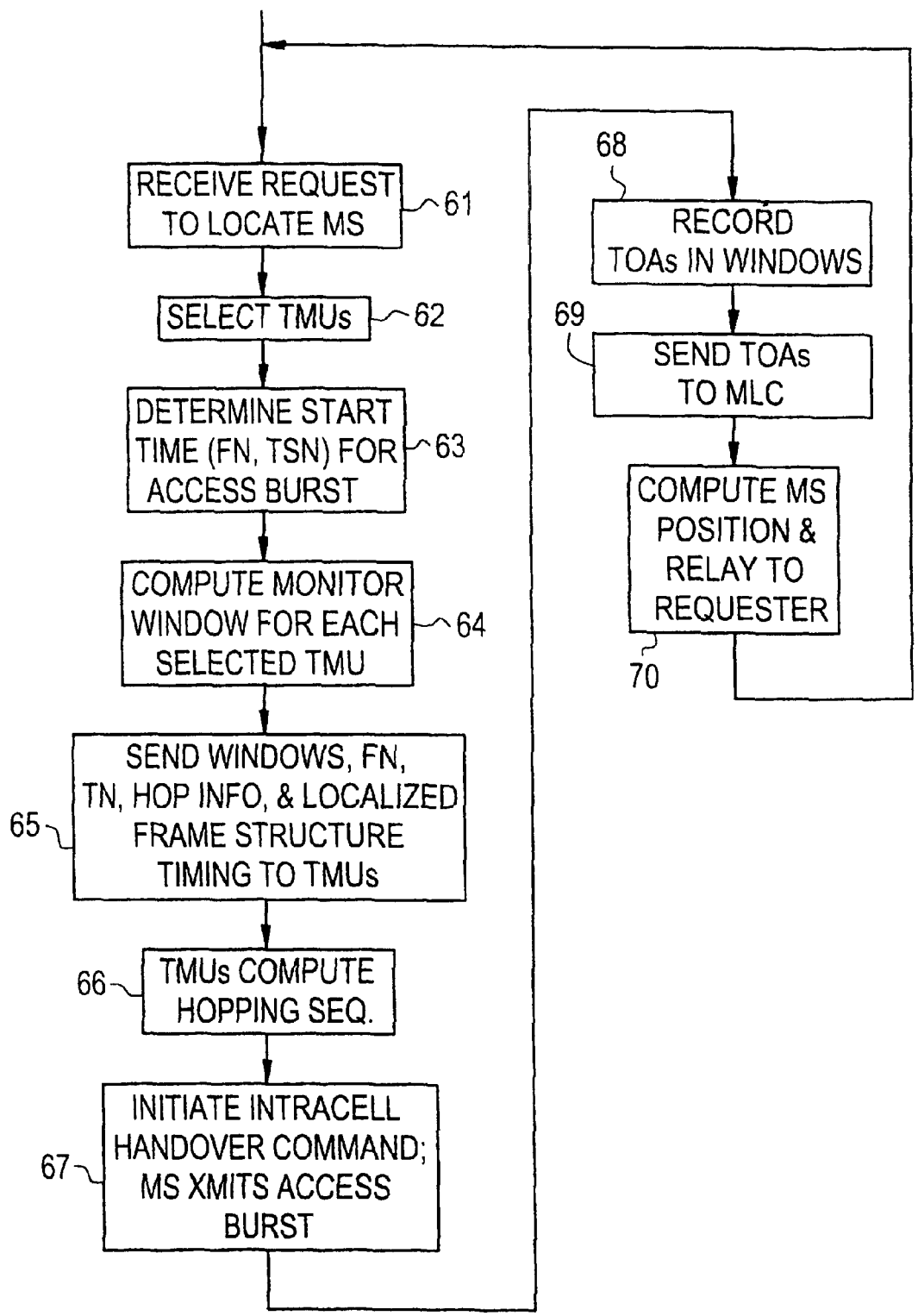
FIG. 4 is a flow diagram which illustrates example operations of the structure of FIGS. 1–3 to implement uplink time of arrival techniques according to the present invention.

FIG. 4 illustrates exemplary operations of the wireless communication system portion of FIG. 1, including the uplink time of arrival techniques of the present invention. At 61, the MLC receives a request to locate the position of a particular mobile station. At 62, the MLC determines the serving cell, obtains transmission parameters of the mobile station (including hopping sequence parameters), and selects which TMUs should be involved in the time of arrival measurement. At 63, the starting frame number and time slot number for the first access burst is specified, either by MLC or from BSC. At 64, the MLC computes the monitoring window for each selected TMU. At 65, the MLC sends the monitoring windows and hopping sequence information to the selected TMUs along with the starting frame and time slot numbers and the localized frame structure timing information. At 66, the selected TMUs compute the hopping sequence. At 67, the intracell handover commend is sent to the mobile station, and the mobile station transmits the access burst in response thereto. At 68, the TMUs record the time of arrival of the access burst within their respective monitoring windows. At 69, the TMUs send the time of arrival information to the MLC. At 70, the MLC computes the position of the mobile station and relays the position information to the requesting node.

As mentioned above, the MLC receives from each TMU the frame structure timing of the associated BTS relative to the TMU's own local time reference. This information, when combined with conventional downlink time of arrival measurements made on BTSs by a stationary reference mobile station, permits the MLC to calculate the ITTDs. If the reference mobile station makes time of arrival measurements on two BTSs, for example, by monitoring the broadcast control channel of each BTS, then the MLC can receive this information (e.g., via BTS, BSC and MSC) and calculate the timing difference between the BTSs. Because the MLC also knows the timing of each BTS's broadcast control channel frame structure relative to the associated TMU, the MLC can easily calculate the ITTD between the two TMUs associated with the two BTSs measured by the reference mobile station. This technique for determining the ITTDs according to the present invention advantageously permits the reference mobile station simply to monitor existing downlink signals from the BTSs, rather than transmit uplink signals to be measured by the TMUs, thus requiring no additional traffic in the network for performing ITTD determinations.

Although exemplary embodiments of the present invention have been described above in detail, this does not limit the scope of the invention, which can be practiced in a variety of embodiments.

What is claimed is:

1. A method of using a time of arrival measurement apparatus to measure the time of arrival of a radio signal transmitted by a mobile communication station operating in a wireless mobile communication network, comprising:

providing the time of arrival measurement apparatus with information indicative of a predetermined point in time at which the radio signal is to be transmitted, said information including a starting frame number associated with the radio signal; and using the time of arrival measurement apparatus to monitor for arrival of the radio signal only during a period of time after said predetermined point in time.

2. The method of claim 1, wherein said providing step includes expressing the predetermined point in time relative to a time base of the time of arrival measurement apparatus.

3. The method of claim 2, including determining a relative timing relationship between the predetermined point in time and the time base of the time of arrival measurement apparatus.

4. The method of claim 3, wherein said determining step includes monitoring a radio communication channel used by the mobile station and determining therefrom a relationship between communication timing of the mobile station and the time base of the time of arrival measurement apparatus.

5. The method of claim 4, wherein the radio communication channel is a control channel of a fixed-site transceiver serving the mobile station, and the communication timing is frame structure timing of the fixed-site transceiver.

6. The method of claim 1, including specifying the information to a node in the network, and thereafter communicating the information from the node to the mobile station.

7. The method of claim 1, including communicating the information from a node in the network to the mobile station, and also communicating the information from the node in the network to a further node in the network that performs said providing step.

8. The method of claim 1, including calculating the period of time based on the information indicative of the predetermined point in time and based on geographic characteristics of the network, the period of time including a predetermined beginning point in time and a predetermined ending point in time, and providing to the time of arrival measurement apparatus information indicative of the period of time.

9. The method of claim 8, wherein the beginning point in time of said period of time is separated by a further period of time from the predetermined point in time at which the radio signal is to be transmitted.

10. The method of claim 1, including providing to the time of arrival measurement apparatus information indicative of a frequency at which the radio signal is to be transmitted, and using the time of arrival measurement apparatus to monitor the frequency for arrival of the radio signal.

11. The method of claim 10, wherein the information indicative of the frequency at which the radio signal is to be transmitted includes the information indicative of the predetermined point in time at which the radio signal is to be transmitted, along with further information indicative of frequency hopping parameters used by the mobile station, and including determining the frequency based on the information indicative of frequency hopping parameters and the information indicative of the predetermined point in time at which the radio signal is to be transmitted.

12. The method of claim 1, wherein said providing step includes providing the information to a plurality of time of arrival measurement apparatuses, and wherein the information provided to each time of arrival measurement apparatus expresses the predetermined point in time relative to a time base of that particular time of arrival measurement apparatus.

13. The method of claim 12, including receiving from a first time of arrival measurement apparatus information indicative of a timing relationship between a time base of the first time of arrival measurement apparatus and communication timing used by the mobile station, and determining from the timing relationship a plurality of other timing relationships between the communication timing used by the mobile station and the respective time bases of the other time of arrival measurement apparatuses.

14. The method of claim 13, including determining differences among the time bases of the respective time of arrival measurement apparatuses.

15. The method of claim 1, wherein the wireless communication network is a 2 GSM network.

16. The method of claim 1, including providing to the time of arrival measurement apparatus information from which an informational content of the radio signal can be determined but which information does not itself reveal the informational content of the radio signal, and the time of arrival measurement apparatus determining the informational content of the radio signal in response to the information, and the time of arrival measurement apparatus using the informational content to measure the time of arrival of the signal.

17. The method of claim 1, further comprising:
   providing the time of arrival measurement apparatus with localized frame structure timing.

18. The method of claim 1, further comprising:
   providing the time of arrival measurement apparatus with time slot number information associated with the radio signal.

19. An apparatus for use in locating a mobile station in a wireless communication network, comprising:
   a plurality of time of arrival monitors, each said time of arrival monitor for monitoring an air interface to determine when a radio signal transmitted by the mobile station has arrived at said time of arrival monitor;
   each said time of arrival monitor including an input for receiving first information indicative of a predetermined point in time at which the mobile station is to transmit the radio signal, wherein said first information received at each time of arrival monitor expresses said predetermined point in time with respect to a local time base associated with that particular time of arrival monitor; and
   each said time of arrival monitor including an output for providing second information indicative of a time of arrival of the radio signal at that time of arrival monitor.

20. The apparatus of claim 19, wherein each said time of arrival monitor includes an input for receiving third information indicative of frequency hopping parameters used by the mobile station.

21. The apparatus of claim 20, wherein each said time of arrival monitor is responsive to said first information and said third information for calculating a frequency at which the radio signal will be transmitted by the mobile station, and each said time of arrival monitor is operable to monitor the calculated frequency for arrival of the radio signal.

22. The apparatus of claim 19, wherein each said time of arrival monitor includes an input for receiving second information indicative of a period of time during which said time of arrival monitor is to monitor the air interface for arrival of the radio signal, wherein said period of time is separated from said predetermined point in time by a further period of time.

23. The apparatus of claim 19, including a plurality of timing monitors respectively associated with said time of arrival monitors, each of said timing monitors coupled to the air interface for monitoring a radio channel used by the mobile station and determining therefrom a timing relationship between communication timing used by the mobile station and the local time base of the associated time of arrival monitor, each of said timing monitors including an output for outputting third information indicative of said timing relationship.

24. The apparatus of claim 23, wherein the radio communication channel is a control channel of a fixed-site transceiver serving the mobile station, and the communication timing is frame structure timing of the fixed-site transceiver.

25. The apparatus of claim 19, wherein the wireless communication network is a GSM network.

26. The apparatus of claim 19, wherein each said time of arrival monitor includes an input for receiving fourth information from which an informational content of the radio signal can be determined but which information does not itself reveal the informational content of the radio signal.

27. The apparatus of claim 26, wherein each said time of arrival monitor is responsive to said fourth information for determining the informational content of the radio signal and for using the informational content of the radio signal to measure the time of arrival of the radio signal at that time of arrival monitor.

28. An apparatus for use in locating a mobile station in a wireless communication network, comprising:
   an input for receiving a request to locate the mobile station;
   an output for indicating that a radio signal is to be transmitted from the mobile station for use in locating the mobile station; and
   an output for providing to a plurality of time of arrival measurement devices first information indicative of a predetermined point in time at which the radio signal is to be transmitted by the mobile station, said first information including a starting frame number associated with the radio signal, said plurality of time of arrival measurement devices monitoring for arrival of the radio signal only during a period of time after said predetermined point in time.

29. The apparatus of claim 28, including an input for receiving second information indicative of a timing relationship between communication timing used by the mobile station and a time base used by a selected time of arrival measurement device.

30. The apparatus of claim 29, including a translator responsive to said second information for determining further timing relationships between the communication timing used by the mobile station and respective time bases used by other time of arrival measurement devices, and an output for outputting the further timing relationships to the respective time of arrival measurement devices.

31. The apparatus of claim 28, including a position locator having an input for receiving second information indicative of time difference relationships between time bases of the plurality of time of arrival measurement devices and having an input for receiving third information from the plurality of time of arrival measurement devices indicating the time at which the radio signal from the mobile station arrived at each time of arrival measurement device, said position locator responsive to said second and third information for determining the position of the mobile station.

32. The apparatus of claim 28, including an output for providing to the time of arrival measurement devices second information indicative of hopping sequence parameters used by the mobile station.

33. The apparatus of claim 28, wherein the wireless communication network is a GSM network.

34. The apparatus of claim 28, including a window determiner having an input for receiving said first information and -for receiving second information indicative of geographic characteristics of the network, said window determiner responsive to said first and second information for determining window periods of time during which the respective time of arrival measurement devices are to monitor for arrival of the radio signal, said last-mentioned output further for providing information indicative of said window periods of time to the time of arrival measurement devices.

35. The apparatus of claim 28, further comprising:
   an input for receiving the starting frame number associated with the radio signal.

36. The apparatus of claim 35, wherein the starting frame number associated with the radio signal is provided by a base station controller.

37. The apparatus of claim 28, further comprising:
an output for providing the plurality of time of arrival measurement devices with time slot number information associated with the radio signal.

38. The apparatus of claim 28, further comprising:
an output for providing the plurality of time of arrival measurement devices with localized frame structure timing.

39. The apparatus of claim 28, wherein said apparatus comprises a mobile location center.

40. The apparatus of claim 29, where in said second information comprises a frame structure timing.

41. A method of determining a time base difference between time of arrival measurement units used in locating a mobile station in a wireless communication network, comprising:
using a stationary reference mobile station to determine a first relationship between time bases of a pair of stationary transceivers in the network;
using a first time of arrival measurement unit to determine a second relationship between the time base of one of the stationary transceivers and a time base of the first time of arrival measurement unit, and using a second time of arrival measurement unit to determine a third relationship between the time base of the other of the stationary transceivers and a time base of the second time of arrival measurement unit; and
determining a time base difference between the first and second time of arrival measurement units in response to the first, second and third relationships.

42. The method of claim 41, wherein the wireless communication network is a GSM network.

43. A method of locating the position of a mobile communication station in a wireless communication network, comprising:
the mobile communication station transmitting an uplink radio signal,
obtaining from the wireless communication network information from which an informational content of the radio signal can be determined but which information does not itself reveal the informational content of the radio signal, the information indicative of a predetermined point in time at which the radio signal is to be transmitted;
monitoring for arrival of the radio signal only during a time after said predetermined point in time,
determining the informational content of the radio signal in response to the information; and
using the informational content of the radio signal to measure the time of arrival of the radio signal at a plurality of predetermined locations.

44. The method of claim 43, wherein said uplink radio signal is a signal requesting a handover of the mobile communication station to a predetermined fixed-site transceiver.

45. The method of claim 44, wherein said information includes information indicative of said fixed-site transceiver.

46. The method of claim 45, wherein the communication network is a GSM network, and wherein the information indicative of said fixed-site transceiver includes a base station identity code which identifies a base station in the GSM network.

47. The method of claim 44, wherein said information includes information identifying the handover.

48. The method of claim 47, wherein the communication network is a GSM network, and wherein the information identifying the handover is a handover reference number.

49. An apparatus for use in locating the position of a mobile communication station in a wireless communication network, comprising:
a plurality of time of arrival monitors, each said time of arrival monitor for monitoring an air interface to determine when a radio signal transmitted by the mobile communication station has arrived at said time of arrival monitor,
each said time of arrival monitor including an input for receiving information from which an informational content of the radio signal can be determined but which information does not itself reveal the informational content of the radio signal, the information indicative of a predetermined point in time at which the radio signal is to be transmitted,
each of said time of arrival monitor monitoring for arrival of the radio signal only during a time after said predetermined point in time; and
each said time of arrival monitor responsive to said information for determining the informational content of the radio signal and using the informational content to measure the time of arrival of the radio signal at that time of arrival monitor.

50. The apparatus of claim 49, wherein said radio signal is a signal requesting a handover of the-mobile communication station to a predetermined fixed-site transceiver.

51. The apparatus of claim 50, wherein said information includes information indicative of said fixed-site transceiver.

52. The apparatus of claim 51, wherein the communication network is a GSM network, and wherein the information indicative of said fixed-site transceiver includes a base station identity code which identifies a base station in the GSM network.

53. The apparatus of claim 50, wherein said information includes information identifying the handover.

54. The apparatus of claim 53, wherein the communication network is a GSM network, and wherein the information identifying the handover is a handover reference number.

55. An apparatus for facilitating the use of at least one time of arrival measurement device to measure the time of arrival of a radio signal transmitted by a mobile station operating in a wireless network, said apparatus comprising:
a first input for receiving starting time information associated with the radio signal, the starting time information including at least one of a starting frame number and a time slot number;
a window determiner for determining a monitoring window indicating a time period for monitoring the radio signal for the at least one time of arrival measurement device using the starting time information; and
a first output for providing a measurement command, including the monitoring window, to the at least one time of arrival measurement device, the at least one time of arrival measurement device monitoring for arrival of the radio signal during the time period indicated by the monitoring window.

56. The apparatus of claim 55, wherein the measurement command further includes at least one of the starting frame number and the time slot number.

57. The apparatus of claim 55, the apparatus further comprising:

a translator for receiving frame structure timing information associated with a fixed-site transceiver serving the mobile station, and determining localized frame structure timing information from the frame structure timing information; and a second output for providing the localized frame structure timing information to the at least one time of arrival measurement device.

58. The apparatus of claim 55, wherein the starting time information is provided to the first input by a base station controller.

59. The apparatus of claim 55, the apparatus further comprising:

a second input for receiving frequency hopping sequence information from a base station controller; and a second output for providing the frequency hopping sequence information to the at least one time of arrival measurement device.

60. The apparatus of claim 55, the apparatus further comprising:

a position locator for receiving time of arrival information from a plurality of at least one time of arrival measurement devices, and determining position information associated with the mobile station; and a second output for transmitting the position information.

* * * * *

UNITED STATES PATENT AND TRADEMARK OFFICE
CERTIFICATE OF CORRECTION

PATENT NO.    : 6,522,887 B2                                      Page 1 of 1
DATED         : February 18, 2003
INVENTOR(S)   : Erik Larsson et al.

It is certified that error appears in the above-identified patent and that said Letters Patent is hereby corrected as shown below:

Column 5,
Line 6, replace "the.monitoring" with -- the monitoring --

Column 6,
Line 61, replace "to A measure" with -- to measure --

Column 10,
Line 57, replace "and -for receiving" with -- and for receiving --

Column 11,
Line 14, replace "claim 29, where in" with -- claim 29, wherein --
Line 41, replace "radio signal," with -- radio signal; --
Line 50, replace "point in time," with -- point in time; --

Column 12,
Line 14, replace "arrival monitor," with -- arrival monitor; --
Line 21, replace "transmitted," with -- transmitted; --
Line 31, replace "the-mobile" with -- the mobile --

Signed and Sealed this

Fifth Day of August, 2003

JAMES E. ROGAN
*Director of the United States Patent and Trademark Office*